US011585216B2

(12) United States Patent
Bloom et al.

(10) Patent No.: US 11,585,216 B2
(45) Date of Patent: Feb. 21, 2023

(54) WEAR-RESISTANT ARMORED CUTTING TOOL

(71) Applicant: Kennametal Inc., Latrobe, PA (US)

(72) Inventors: Robbie D. Bloom, Bedford, PA (US); James R. Geyer, Bedford, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 17/239,760

(22) Filed: Apr. 26, 2021

(65) Prior Publication Data
US 2022/0341321 A1    Oct. 27, 2022

(51) Int. Cl.
*E21C 35/18* (2006.01)
*E21C 35/183* (2006.01)
*B23K 1/00* (2006.01)
*C21D 9/22* (2006.01)
*C21D 1/18* (2006.01)

(52) U.S. Cl.
CPC ...... *E21C 35/1831* (2020.05); *E21C 35/1835* (2020.05); *E21C 35/1837* (2020.05); *B23K 1/0008* (2013.01); *C21D 1/18* (2013.01); *C21D 9/22* (2013.01); *C21D 2211/008* (2013.01)

(58) Field of Classification Search
CPC .................... E21C 35/183–1837; B28D 1/188
See application file for complete search history.

(56) References Cited

U.S. PATENT DOCUMENTS

| 4,944,559 A | * | 7/1990 | Sionnet | E21C 35/183 |
| | | | | 299/105 |
| 7,963,616 B2 | * | 6/2011 | Weaver | E21C 35/183 |
| | | | | 299/113 |
| 8,007,048 B2 | | 8/2011 | Fader et al. | |
| 10,415,385 B2 | | 9/2019 | Kraemer et al. | |
| 10,465,512 B2 | | 11/2019 | Kenno et al. | |
| 2007/0290547 A1 | * | 12/2007 | Hall | E21C 35/183 |
| | | | | 299/105 |
| 2008/0035383 A1 | * | 2/2008 | Hall | E21C 35/1933 |
| | | | | 175/414 |
| 2008/0036281 A1 | * | 2/2008 | Hall | E21C 35/19 |
| | | | | 299/105 |
| 2008/0106138 A1 | * | 5/2008 | Yang | E21C 35/183 |
| | | | | 299/104 |
| 2018/0245467 A1 | * | 8/2018 | Kenno | E21C 35/183 |

FOREIGN PATENT DOCUMENTS

| CN | 201078233 Y | 6/2008 |
| DE | 4039217 A1 | 6/1992 |
| DE | 19821147 A1 | 11/1999 |

* cited by examiner

*Primary Examiner* — Janine M Kreck
(74) *Attorney, Agent, or Firm* — Christopher J. Owens (57) ABSTRACT

A wear-resistant armored cutting tool may be provided. The wear-resistant armored cutting tool may include a tool body, a bolster, at least one wear-resistant member, and a cutting tip. The bolster may be fixedly attached to the tool body with an end of a surface of the tool body disposed adjacent the bolster. The at least one wear-resistant member may be fixedly attached to the tool body. The at least one wear-resistant member may be disposed adjacent to the end of the surface of the tool body. The cutting tip may be fixedly attached to the bolster. The bolster, the at least one wear-resistant member, and the cutting tip may each have a material hardness which is greater than that of the tool body.

26 Claims, 8 Drawing Sheets

FIG. 10

WEAR-RESISTANT ARMORED CUTTING TOOL

FIELD OF THE DISCLOSURE

The disclosure relates to wear-resistant armored cutting tools which may be used for cutting operations such as earth cutting.

BACKGROUND

Cutting tools, such as earth cutting tools, often experience severe wear during use. The bodies of these cutting tools may wash out leaving a thin cross-section of the tool behind that is susceptible to failure, and which may leave an undesired milling pattern. These cutting tools often fail and need to be replaced.

Cutting tools and methods of their manufacture are needed to overcome one or more issues of the existing cutting tools.

SUMMARY

In one embodiment, a wear-resistant armored cutting tool may be provided. The wear-resistant armored cutting tool may include a tool body, a bolster, at least one wear-resistant member, and a cutting tip. The bolster may be fixedly attached to the tool body with an end of a surface of the tool body disposed adjacent the bolster. The at least one wear-resistant member may be fixedly attached to the tool body. The at least one wear-resistant member may be disposed adjacent to the end of the surface of the tool body. The cutting tip may be fixedly attached to the bolster. The bolster, the at least one wear-resistant member, and the cutting tip may each have a material hardness which is greater than that of the tool body.

In another embodiment, a wear-resistant armored cutting tool may be provided. The wear-resistant armored cutting tool may include a tool body, a bolster, at least one wear-resistant member, and a cutting tip. The bolster may be fixedly attached to the tool body. The at least one wear-resistant member may be fixedly attached to the tool body. The cutting tip may be fixedly attached to the bolster. An end of the cutting tip may be made of polycrystalline diamond. The bolster, the at least one wear-resistant member, and the cutting tip may each have a material hardness which is greater than that of the tool body.

In still another embodiment, a method of manufacturing a wear-resistant armored cutting tool may be provided. In one step, at least one wear-resistant member and a bolster may be fixedly attached to a tool body. The bolster and the at least one wear-resistant member may each have a material hardness which is greater than that of the tool body. In a simultaneous step, a desired microstructure of the tool body may be achieved.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
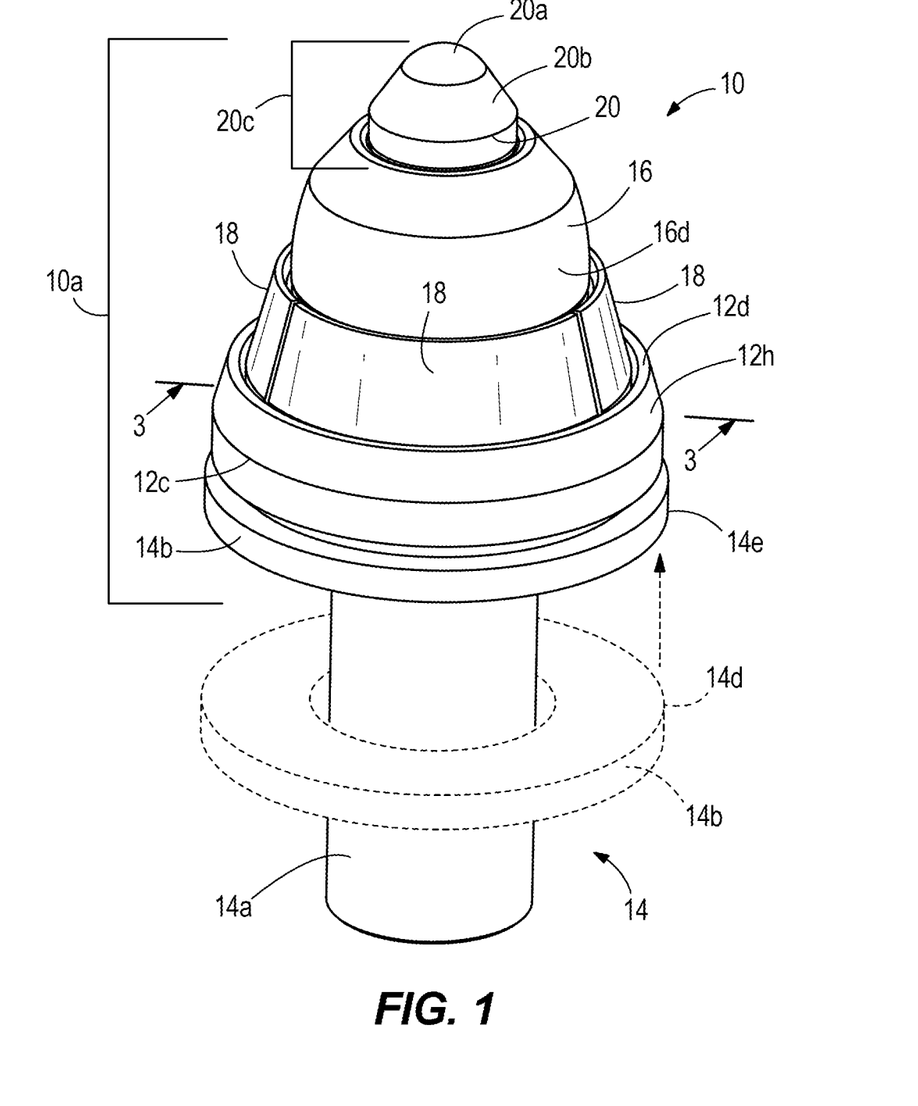
FIG. 1 illustrates a perspective view of one embodiment of an assembled wear-resistant armored cutting tool.
Figure 2:
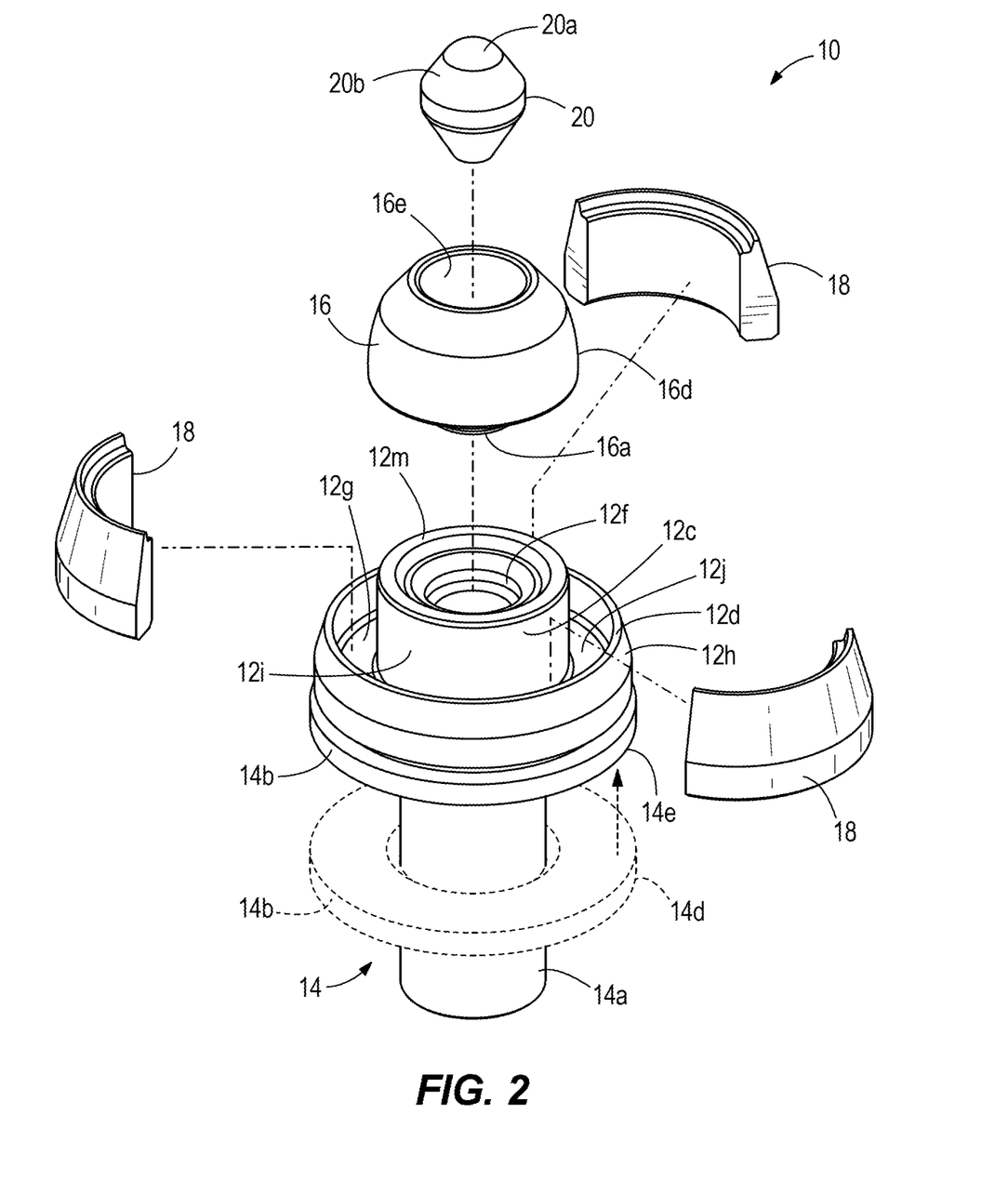
FIG. 2 illustrates a perspective view of the wear-resistant armored cutting tool of the embodiment of FIG. 1 in a disassembled state.
Figure 3:
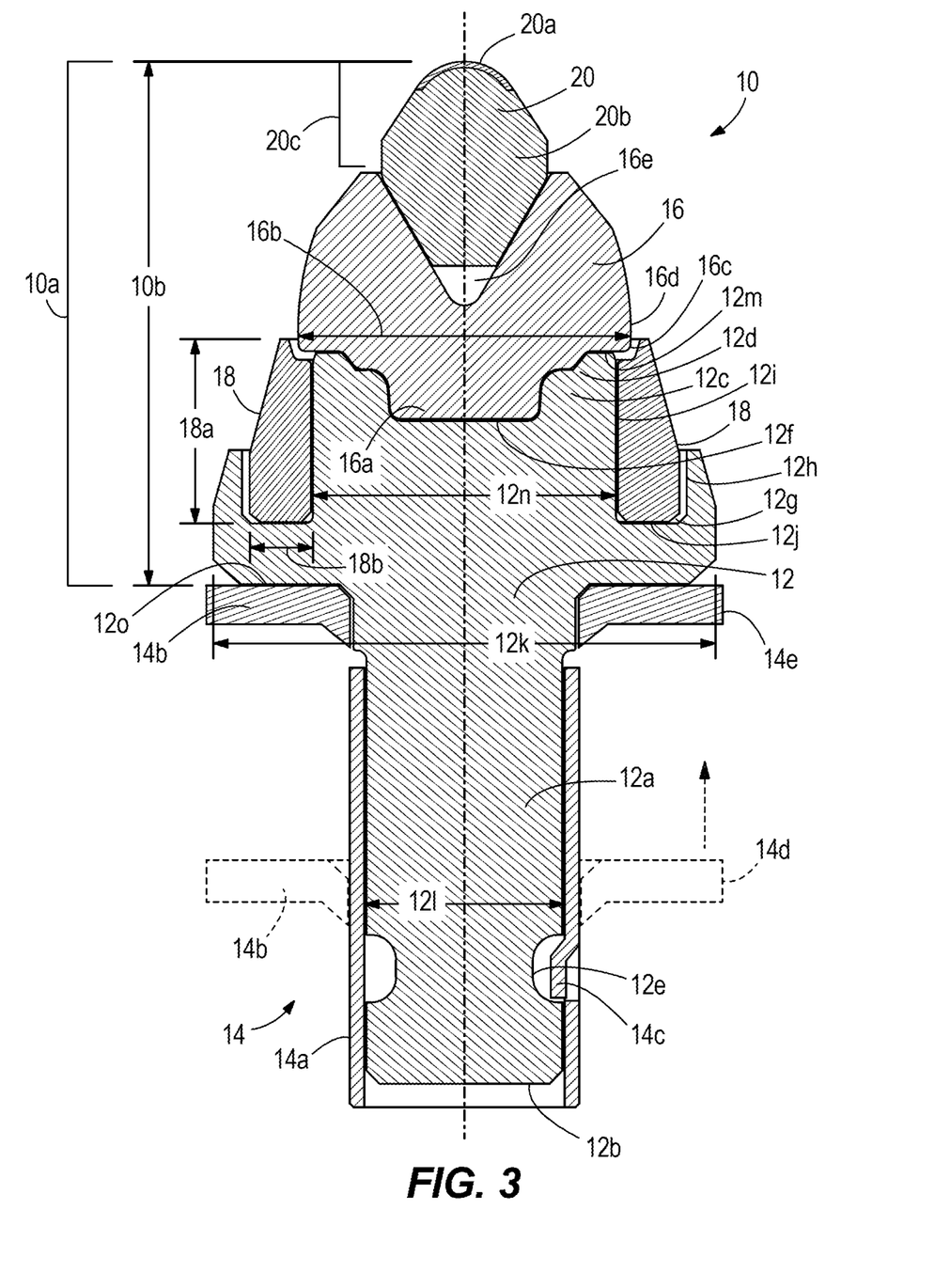
FIG. 3 illustrates a cross-sectional view along line 3-3 of the wear-resistant armored cutting tool of the embodiment of FIG. 1.

FIGS. 1-3 illustrate assembled, disassembled, and cross-sectional views of one embodiment of a wear-resistant armored cutting tool 10. The wear-resistant armored cutting tool 10 may be used for earth cutting during road construction. In other embodiments, the wear-resistant armored cutting tool 10 may be used during other types of cutting operations. As shown collectively in FIGS. 1-3, the wear-resistant armored cutting tool 10 may comprise a tool body 12, a retainer system 14, a bolster 16, a plurality of wear-resistant members 18, and a cutting tip 20. In other embodiments, the wear-resistant armored cutting tool 10 may comprise various components in varying configurations.

The tool body 12 may be made of steel. In other embodiments, the tool body 12 may be made of varying materials. The tool body 12 may comprise a shank 12a at one end 12b, and a holder 12c at a second end 12d. The shank 12a and the holder 12c may be cylindrical in shape. The shank 12a may comprise a cavity 12e which extends around a circumference of the shank 12a. The holder 12c may comprise an inner mating portion 12f which may be female. In other embodiments, the inner mating portion 12f may be male. The holder 12c may further comprise a pocket 12g. The pocket 12g may comprise surfaces 12h, 12i, and 12j. Surfaces 12h and 12i may comprise side-walls of the pocket 12g, and surface 12j may comprise a floor of the pocket 12g. Surface 12i may have a length which is greater than that of surface 12h. The pocket 12g, including surfaces 12h and 12i, may extend around the inner mating portion 12f. An outer diameter 12k of the holder 12c may be larger than an outer diameter 12l of the shank 12a.

The retainer system 14 may comprise a retainer member 14a and a washer 14b. The retainer member 14a and washer 14b may be made of steel. In other embodiments, the retainer member 14a and washer 14b may be made of varying materials. The retainer member 14a may be cylindrical and extend to, over, and around the shank 12a. The retainer member 14*a* may be attached to the shank 12*a* using a washer 14*b* and a retainer tab 14*c*. In other embodiments, the retainer member 14*a* may be attached to the shank 12*a* using other attachment methods. The washer 14*b* may be slidably disposed to and over the retainer member 14*a*. The retainer tab 14*c* of the retainer member 14*a* may be configured to be mated with and held within the cavity 12*e* of the shank 12*a* attaching the retainer member 14*a* to the shank 12*a*. When the washer 14*b* is disposed over the retainer member 14*a* adjacent the cavity 12*e* at location 14*d* the retainer member 14*a* may be compressed and the retainer tab 14*c* may mate with the cavity 12*e*. When, during installation of the wear-resistant armored cutting tool 10 into a bore (not shown) of a rotating drum (not shown), the washer 14*b* may be slidably moved along the retainer member 14*a* from location 14*d* adjacent the cavity 12*e* to a second location 14*e* adjacent the holder 12*c* of the tool body 12. This movement of the washer 14*b* may cause the retainer member 14*a* to expand into a face of the bore of the rotating drum.

The hardness of the bolster 16 may be greater than that of the tool body 12. The bolster 16 may have a material hardness of at least 58 Rockwell C Hardness (HRC). In one embodiment, the bolster 16 may be made of cemented Tungsten Carbide (WC—Co alloy) having a cobalt content ranging from about 5 to about 13 weight percent. In other embodiments, the bolster 16 may be made of varying materials having varying hardness. An inner mating portion 16*a* of the bolster 16 may be fixedly attached to the inner mating portion 12*f* of the tool body 12. The inner mating portion 16*a* may be male. In other embodiments, the inner mating portion 16*a* may be female. In one embodiment, the inner mating portion 16*a* of the bolster 16 may be brazed to the inner mating portion 12*f* of the tool body 12. In other embodiments, the inner mating portion 16*a* of the bolster 16*a* may be fixedly attached to the inner mating portion 12*f* of the tool body 12 using other attachment methods. End 12*m* of surface 12*i* of the tool body 12 may be disposed adjacent to the bolster 16. A diameter 16*b* of a portion 16*c* of the bolster 16 may be greater than a diameter 12*n* of surface 12*i* of the tool body 12. In such manner, an outer surface 16*d* of the bolster 16 may circumferentially cover, and armor, the end 12*m* of surface 12*i* of the tool body 12. The bolster 16 may comprise a mushroom shape. In other embodiments, the bolster 16 may vary in shape.

The hardness of the plurality of wear-resistant members 18 may be greater than that of the tool body 12. The plurality of wear-resistant members 18 may have a material hardness of at least 58 Rockwell C Hardness (HRC). In one embodiment, the plurality of wear-resistant member 18 may be made of cemented Tungsten Carbide (WC—Co alloy) having a cobalt content ranging from about 5 to about 13 weight percent. In other embodiments, the plurality of wear-resistant members 18 may be made of varying materials having varying hardness. The plurality of wear-resistant members 18 may be fixedly attached within the pocket 12*g* to the surfaces 12*h*, 12*i*, and 12*j* of the tool body 12. In one embodiment, the plurality of wear-resistant members 18 may be brazed within the pocket 12*g* to the surfaces 12*h*, 12*i*, and 12*j* of the tool body 12. In other embodiments, the plurality of wear-resistant members 18 may be attached within the pocket 12*g* to the surfaces 12*h*, 12*i*, and 12*j* of the tool body 12 using varying attachment methods. The plurality of wear-resistant members 18 may comprise three, semi-circular tiles which each cover one-hundred-twenty degrees (120°) of the circumference of the surface 12*i* of the tool body 12 to collectively cover the entire circumference of the surface 12*i* of the tool body 12. In other embodiments, any number of abutting wear-resistant members 18 in varying sizes and shapes may be used to collectively cover the entire circumference of the surface 12*i* of the tool body 12. The plurality of wear-resistant members 18 may extend from the surface 12*j* of the tool body 12 to the end 12*m* of the surface 12*i* of the tool body 12 and adjacent the portion 16*c* of the bolster 16. In such manner, the plurality of wear-resistant members 18 may completely cover, and armor, the entire surface 12*i* of the tool body 12. In other embodiments, any number of abutting wear-resistant members 18 may be used to collectively cover, and armor, varying surfaces of the tool body 12.

The hardness of the cutting tip 20 may be greater than that of the tool body 12. The cutting tip 20 may have a material hardness of at least 58 Rockwell C Hardness (HRC). In one embodiment, an end 20*a* of the cutting tip 20 may be made of a different material than a substrate 20*b* of the cutting tip 20. The end 20*a* of the cutting tip 20 may be made of a material harder than the substrate 20*b* of the cutting tip 20, both of which may have a material hardness greater than that of the tool body 12. In one embodiment, the substrate 20*b* of the cutting tip 20 may be made of cemented Tungsten Carbide (WC—Co alloy) having a cobalt content ranging from about 5 to about 13 weight percent, and the end 20*a* of the cutting tip 20 may be made of polycrystalline diamond. In other embodiments, the cutting tip 20 may be made of varying materials having varying hardness. The cutting tip 20 may be fixedly attached within and to a pocket 16*e* of the bolster 16. A top portion 20*c* of the cutting tip 20 may extend out of the pocket 16*e* of the bolster 16. In one embodiment, the cutting tip 20 may be brazed within and to the pocket 16*e* of the bolster 16. In other embodiments, the bolster 16 may be attached within and to the pocket 16*e* of the bolster 16 using varying attachment methods.

The head 10*a* of the wear-resistant armored cutting tool 10 may comprise the holder 12*c*, the bolster 16, the plurality of wear-resistant members 18, and the cutting tip 20. The head 10*a* of the wear-resistant armored cutting tool 10 may have a length 10*b* extending from an end 12*o* of the holder 12*c* to end 20*a* of the cutting tip 20. The maximum diameter of the head 10*a* of the wear-resistant armored cutting tool 10 may comprise the outer diameter 12*k* of the holder 12*c*. A length 18*a* of the plurality of wear-resistant members 18 may cover at least 10% to 70% of the length 10*b* of the head 10*a* of the wear-resistant armored cutting tool 10. A thickness 18*b* of the plurality of wear-resistant members 18 may be between 3% to 30% of the outer diameter 12*k* of the holder 12*c*. In other embodiments, the dimensions of the head 10*a* of the wear-resistant armored cutting tool 10 including its components may vary.

When the wear-resistant armored cutting tool 10 is attached to a rotating drum (not shown), the shank 12*a* may be inserted into a retention system (not shown) of a bore of the rotating drum which may force the washer 14*b* to slide from location 14*d* adjacent the cavity 12*e* of the shank 12*a* to the second location 14*e* adjacent the holder 12*c* of the tool body 12. As this occurs, the retainer member 14*a* may expand outwardly against a face of the bore of the rotating drum thereby locking the retainer member 14 to the retention system of the bore of the rotating drum as a result of friction. In such manner, the wear-resistant armored cutting tool 10 including the retainer member 14 and the attached shank 12*a*, as a result of the retainer tab 14*c* being held within the cavity 12*e* of the shank 12*a*, may be fixed to the rotating drum so that they are configured to rotate with the rotating drum during cutting or operation of the rotating drum. To allow the use of the retainer tab 14*c* to effectively lock the wear-resistant armored cutting tool 10 to the drum, the mass of the head 10a of the wear-resistant armored cutting tool 10 may be kept as low as possible. The use of the one or more hard but relatively low mass wear-resistant members 18, relative to the hard but high mass of the bolster 16, to armor the tool body 12 at the critical locations of the holder 12c may allow the use of the less hard and less dense material of the tool body 12 to keep the mass of the head 10a of the wear-resistant armored cutting tool 10 at a manageable level. In one embodiment, the hard but high mass bolster 16 may have a density of between 14-15 grams per cubic centimeter, may have a hardness greater than 58 HRC, and may have a volume of 1.5-5 times larger than the at least one wear-resistant member 18. The at least one wear-resistant member 18 may have a hardness and density comparable to the bolster 16. The holder 12c of the tool body 12 may have a density of 7.2-8.2 grams per cubic centimeter. This may effectively provide a mass-efficient armoring system, which utilizes a bolster 16 and one or more wear-resistant members 18 that have superior wear characteristics as comparted to the material of the tool body 12, to armor the tool body 12 of a cutting tool 10 to protect it against wear and erosion during a cutting operation. This may protect the tool body 12 of the cutting tool 10 from washing-out and causing failure of the cutting tool 10 which prevents the resultant undesired cutting pattern of a failed cutting tool 10.

Figure 4:
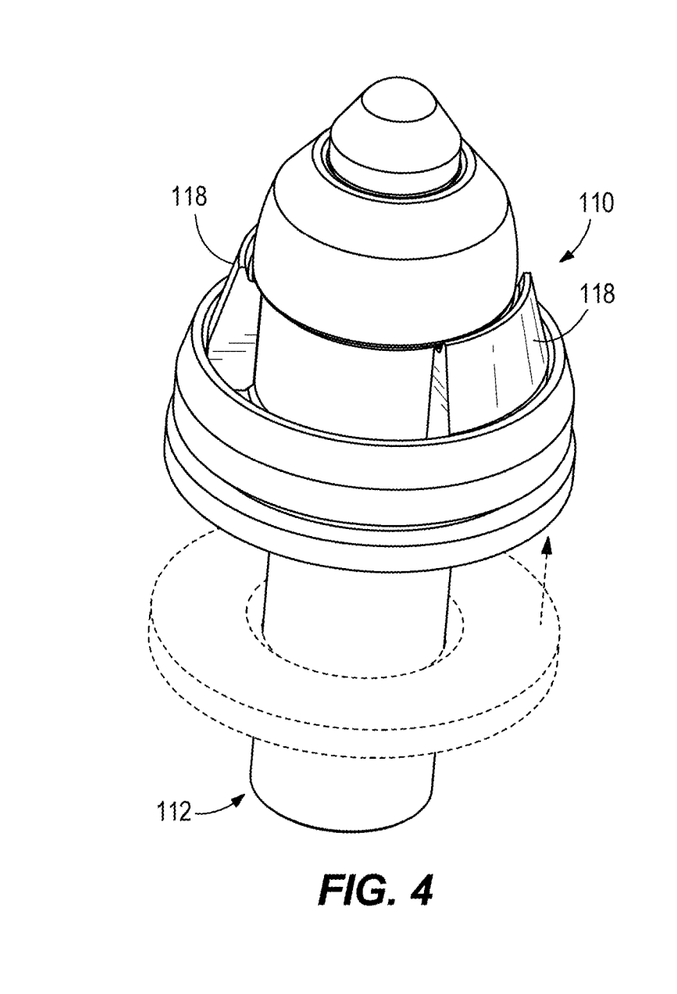
FIG. 4 illustrates a perspective view of another embodiment of an assembled wear-resistant armored cutting tool.
Figure 5:
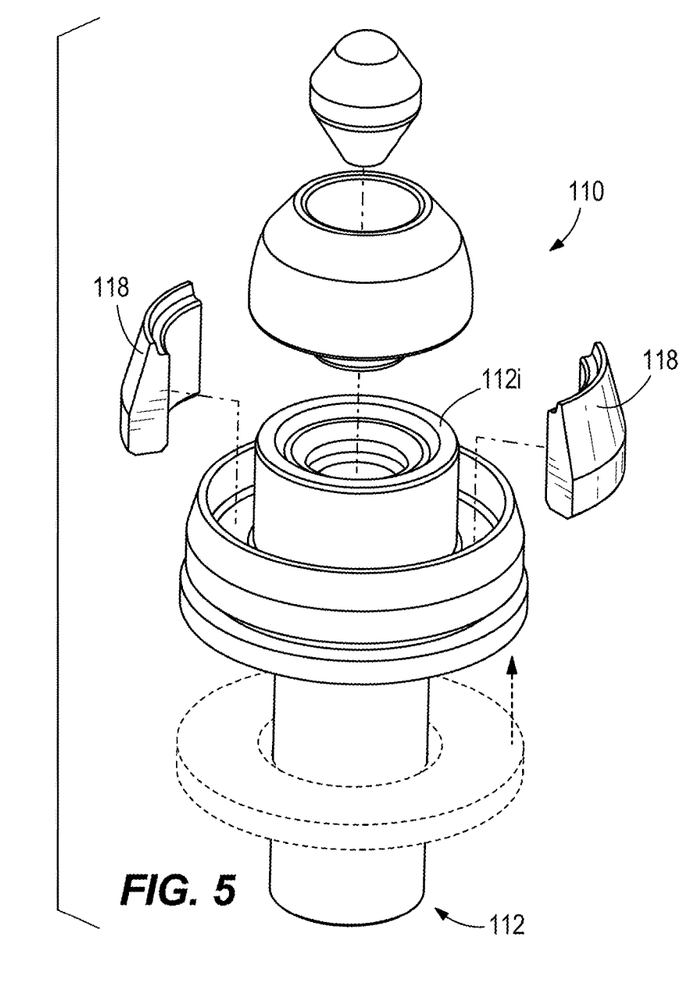
FIG. 5 illustrates a perspective view of the wear-resistant armored cutting tool of the embodiment of FIG. 4 in a disassembled state.

FIGS. 4-5 illustrate assembled and disassembled views of another embodiment of a wear-resistant armored cutting tool 110. The wear-resistant armored cutting tool 110 may be used for earth cutting during road construction. In other embodiments, the wear-resistant armored cutting tool 110 may be used during other types of cutting operations. As shown collectively in FIGS. 4-5, the wear-resistant armored cutting tool 110 may be identical to the wear-resistant armored cutting tool 10 of the embodiment of FIGS. 1-3 except that the plurality of wear-resistant members 118 may comprise only two non-abutting, semi-circular tiles which cover only a portion of the circumference of the surface 112i of the tool body 112. In other embodiments, the wear-resistant armored cutting tool 110 may utilize at least one wear-resistant member 118 which covers only a portion of the circumference of the surface 112i of the tool body 112. For instance, in one embodiment the at least one wear-resistant member 118, which may comprise a plurality of non-abutting wear-resistant members 118, may be used to cover more than 40% but less than 100% of a circumference of the surface 112i of the tool body 112. In other embodiments, the at least one wear-resistant member 118 may cover a varying percentage of the circumference of the surface 112i of the tool body 112. In still other embodiments, the at least one wear-resistant member 118 may be in varying configurations to cover varying surfaces of varying configuration cutting tools 110.

Figure 6:
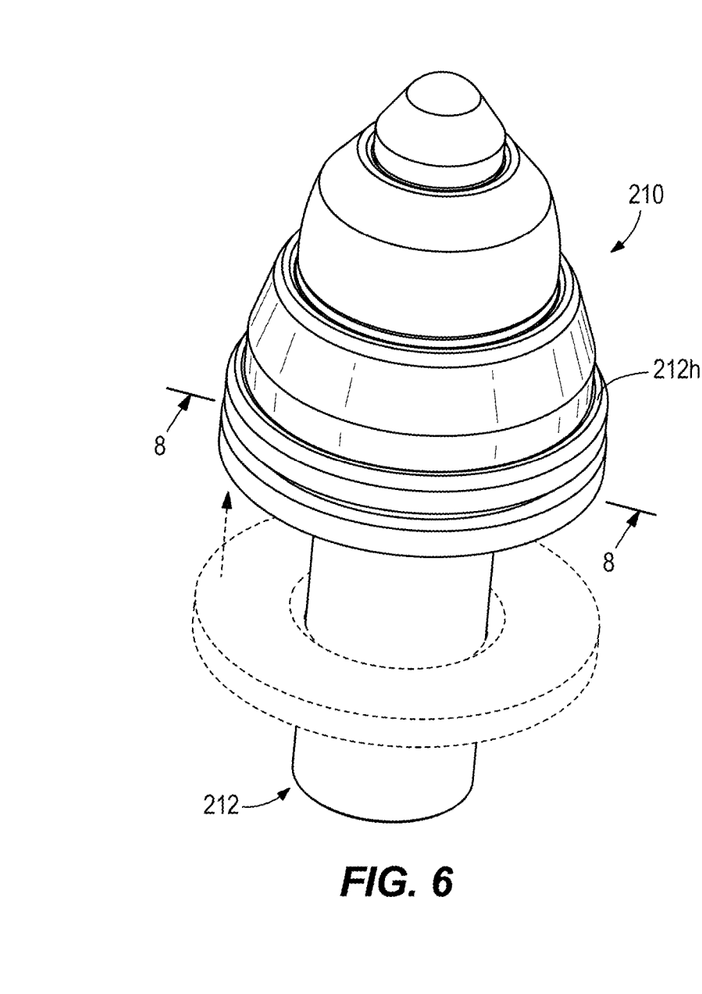
FIG. 6 illustrates a perspective view of yet another embodiment of an assembled wear-resistant armored cutting tool.
Figure 7:
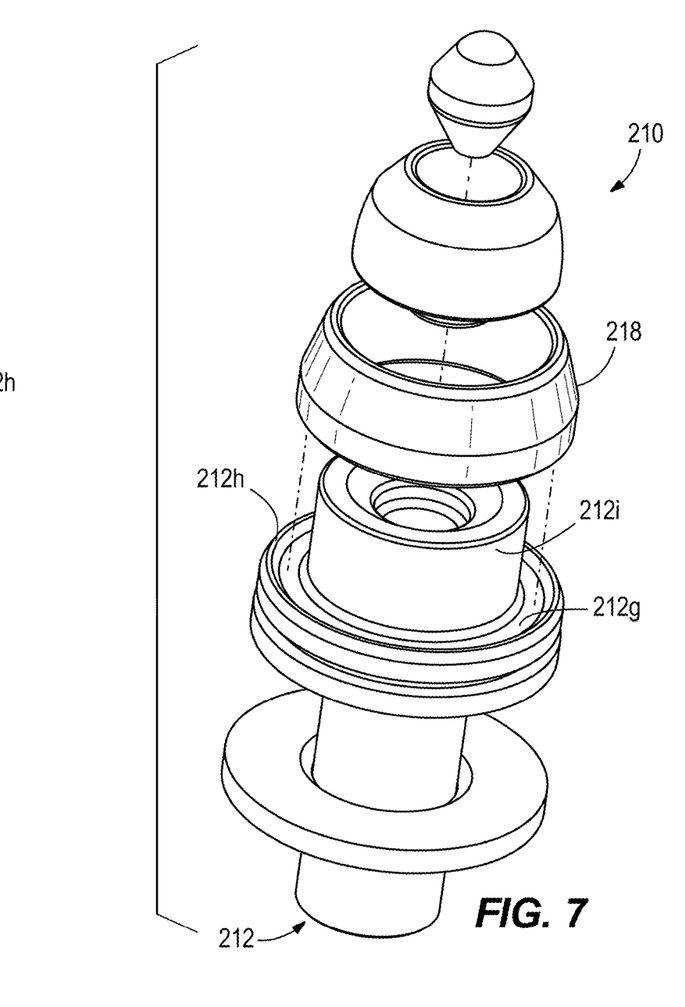
FIG. 7 illustrates a perspective view of the wear-resistant armored cutting tool of the embodiment of FIG. 6 in a disassembled state.
Figure 8:
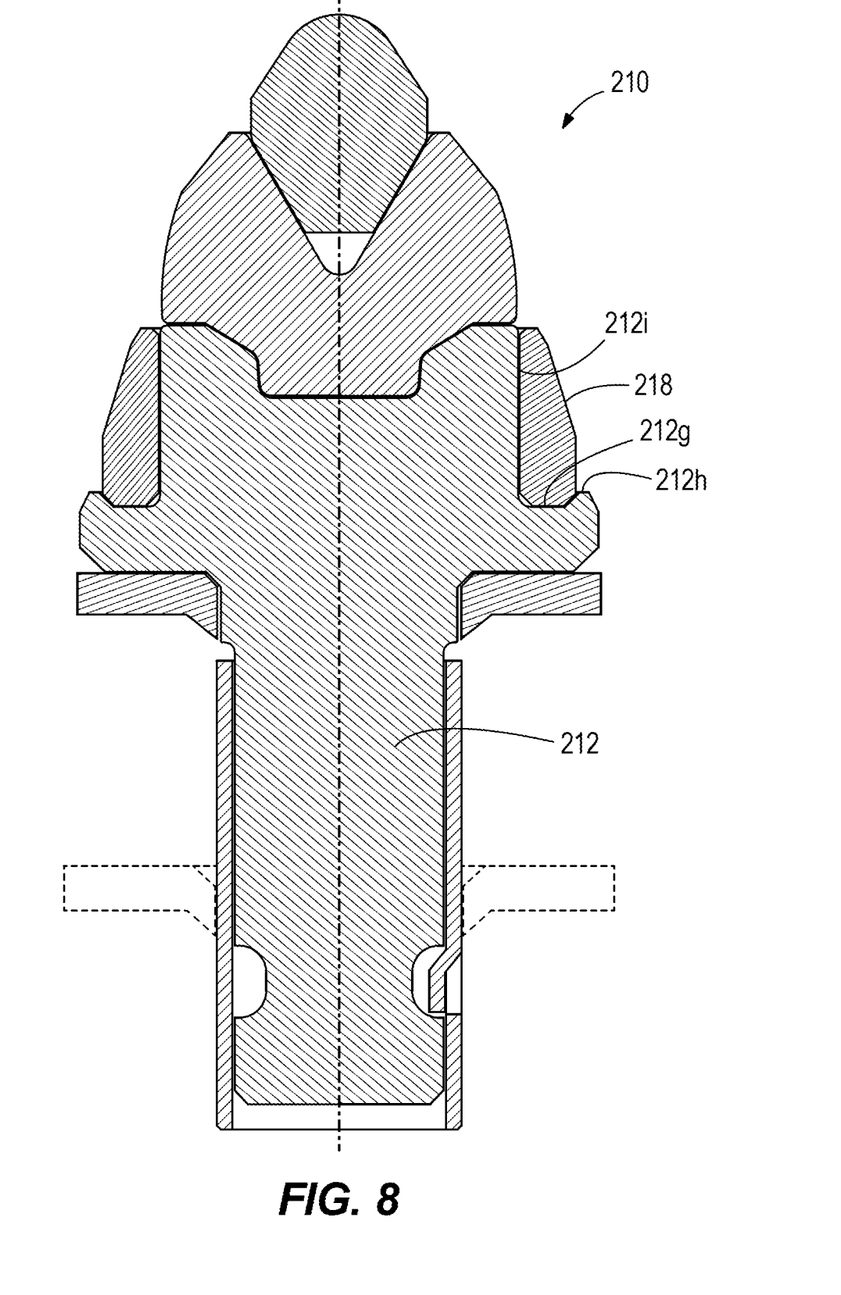
FIG. 8 illustrates a cross-sectional view along line 8-8 of the wear-resistant armored cutting tool of the embodiment of FIG. 6.

FIGS. 6-8 illustrate assembled, disassembled, and cross-sectional views of another embodiment of a wear-resistant armored cutting tool 210. The wear-resistant armored cutting tool 210 may be used for earth cutting during road construction. In other embodiments, the wear-resistant armored cutting tool 210 may be used during other types of cutting operations. As shown collectively in FIGS. 6-8, the wear-resistant armored cutting tool 210 may be identical to the wear-resistant armored cutting tool 10 of the embodiment of FIGS. 1-3 except for the following: (1) only one wear-resistant member 218, comprising a ring which covers an entire circumference of the surface 212i of the tool body 212, is utilized; and (2) surface 212h of the pocket 212g is much shorter. In one embodiment, surface 212h of the pocket 212g is 0-50% of the height of surface 212i. In still other embodiments, the wear-resistant member 218 may be in varying configurations to cover varying surfaces of varying configuration cutting tools 210.

Figure 9:
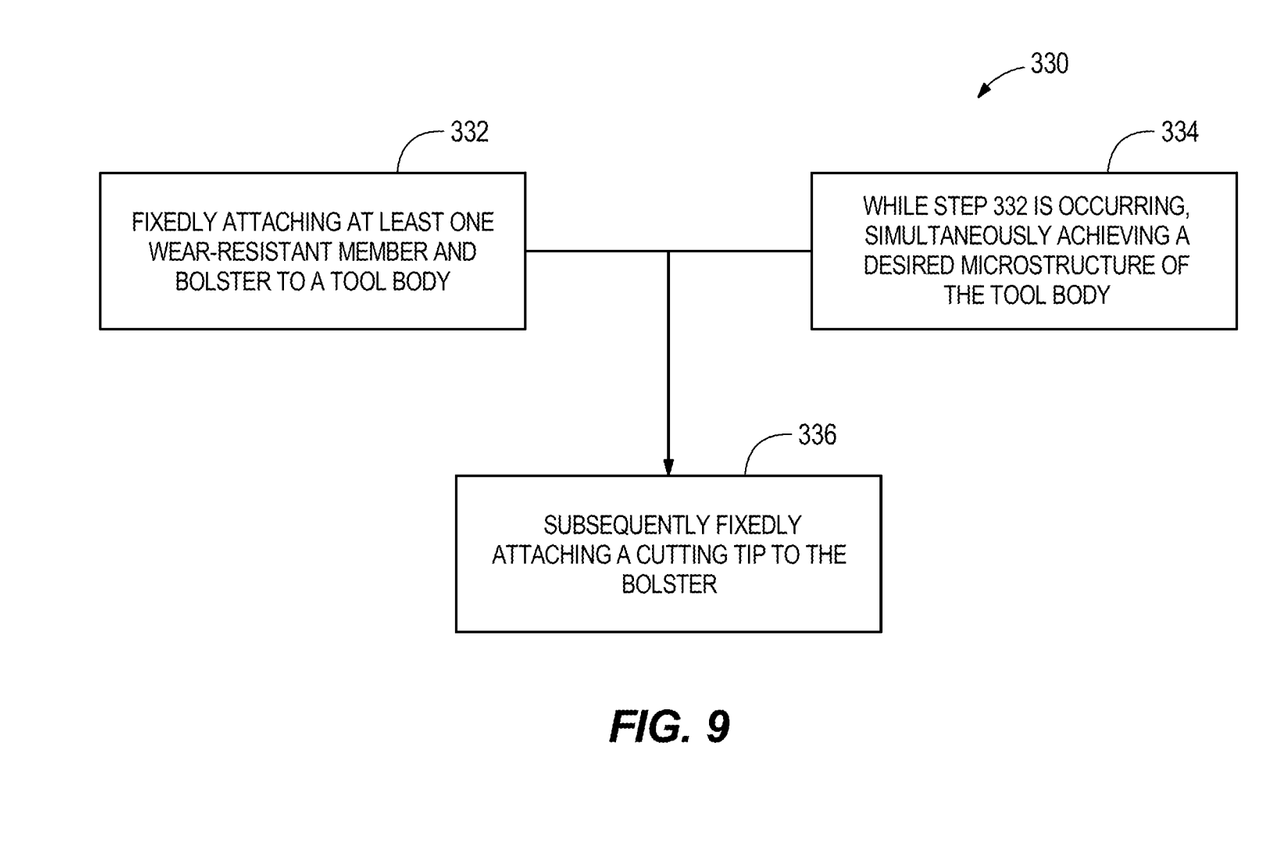
FIG. 9 is a flowchart illustrating one embodiment of a method of manufacturing a wear-resistant armored cutting tool.

FIG. 9 illustrates a flowchart of one embodiment of a method 330 of manufacturing a wear-resistant armored cutting tool. The method 330 may be used to manufacture any of the wear-resistant armored cutting tools of the disclosure. In other embodiments, the method 330 may be used to manufacture varying wear-resistant armored cutting tools.

In step 332, at least one wear-resistant member and bolster may be fixedly attached to a tool body. The bolster and the at least one wear-resistant member may each have a material hardness which is greater than that of the tool body. The fixedly attaching may comprise brazing. In other embodiments, the fixedly attaching may comprise other attachment methods. Step 334 may comprise, while step 332 is occurring, simultaneously achieving a desired microstructure of the tool body. The desired microstructure may comprise a fine grain martensitic structure. In other embodiments, the desired microstructure may vary. The achieving may comprise heating and rapidly cooling the tool body. In other embodiments, the achieving may vary. Step 336 may comprise subsequently fixedly attaching a cutting tip to the bolster. The fixedly attaching may comprise brazing. In other embodiments, the fixedly attaching may comprise other attachment methods. The material hardness of the cutting tip may be greater than that of the tool body, and an end of the cutting tip may comprise a material harder than a substrate of the cutting tip, such as polycrystalline diamond. In other embodiments, the material of the cutting tip may vary.

In other embodiments, one or more steps of the method 330 may not be followed, may be modified in substance or order, or one or more additional steps may be added. In still other embodiments, the method 330 may further vary to manufacture varied wear-resistant armored cutting tools.

Figure 10:
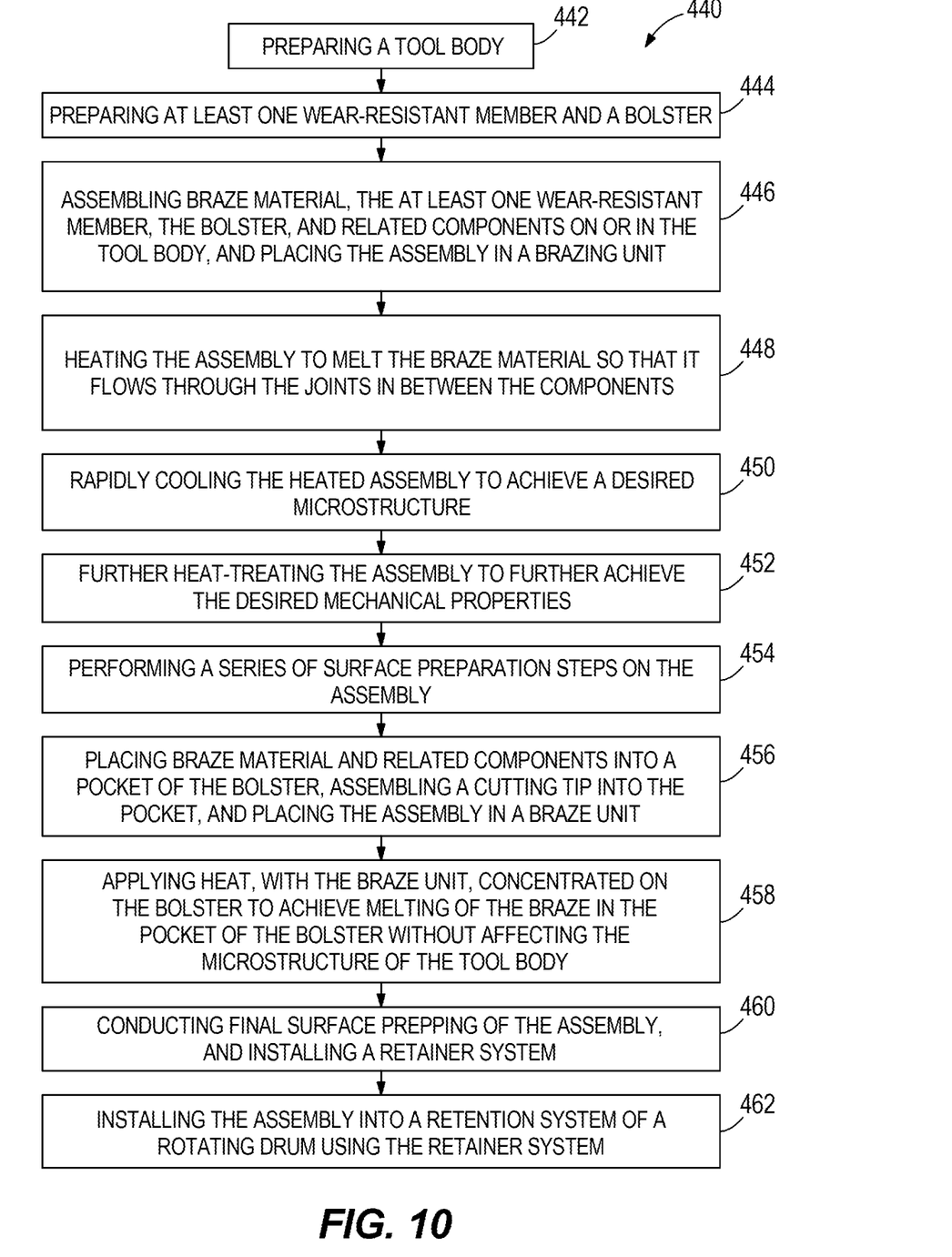
FIG. 10 is a flowchart illustrating another embodiment of a method of manufacturing a wear-resistant armored cutting tool.

FIG. 10 illustrates a flowchart of one embodiment of a method 440 of manufacturing a wear-resistant armored cutting tool. The method 440 may be used to manufacture any of the wear-resistant armored cutting tools of the disclosure. In other embodiments, the method 440 may be used to manufacture varying wear-resistant armored cutting tools.

In step 442, a tool body may be prepared. The tool body may be machined to size. In other embodiments, the tool body may be prepared using varying manufacturing mechanisms. The tool body may be made of steel. In other embodiments, the material of the tool body may vary. In step 444, at least one wear-resistant member and a bolster may be prepared. The at least one wear-resistant member and bolster may be pressed and sintered. In other embodiments, the at least one wear-resistant member and bolster may be prepared using varying manufacturing systems. The at least one wear-resistant member and bolster may be made of a material harder than the material of the tool body such as cemented Tungsten Carbide (WC—Co alloy) having a cobalt content ranging from about 5 to about 13 weight percent or another material. The at least one wear-resistant member and bolster may have a material hardness of at least 58 Rockwell C Hardness (HRC). In other embodiments, the at least one wear-resistant member and bolster may be made of varying materials having varying hardness.

In step 446, braze material, the at least one wear-resistant member, the bolster, and related components may be assembled on or in the tool body, and the assembly may be placed in a brazing unit. In step 448, the assembly may be heated to melt the braze material so that it flows through the joints in between the components. In one embodiment, step 448 may comprise heating the assembly at a temperature greater than 1,750 Fahrenheit (1,750° F.). In other embodiments, the temperature may vary. A braze joint may be between 0.002 inches to 0.030 inches thick. In other embodiments, the dimensions of the braze joint may vary. While the braze material is molten the at least one wear-resistant member and the bolster may be adjusted into their final position relative to the tool body. In step 450, the heated assembly may be rapidly cooled to achieve a desired microstructure. The desired microstructure may be a fine grain martensitic structure. In other embodiments, the desired microstructure may vary.

In step 452, the assembly may be further heat-treated to further achieve the desired mechanical properties. In step 454, the assembly may go through a series of surface preparation steps. The surface preparation steps may comprise blasting, cleaning, or other surface preparation steps. The hardness of the cutting tip may be greater than that of the tool body. The cutting tip may have a material hardness of at least 58 Rockwell C Hardness (HRC). An end of the cutting tip may be made of a different material than a substrate of the cutting tip. The end of the cutting tip may be made of a material harder than the substrate of the cutting tip, both of which may have a material hardness greater than that of the tool body. The substrate of the cutting tip may be made of cemented Tungsten Carbide (WC—Co alloy) having a cobalt content ranging from about 5 to about 13 weight percent, and the end of the cutting tip may be made of polycrystalline diamond. In other embodiments, the cutting tip may be made of varying materials having varying hardness.

In step 456, the assembly may be stationed in front of a braze unit. The braze material and related components may be assembled into the pocket of the bolster. The cutting tip may be assembled into the pocket and the assembly may be placed in the braze unit. In step 458, the braze unit may apply heat concentrated on the bolster to achieve melting of the braze in the pocket of the bolster without affecting the microstructure of the tool body. In step 460, final surface prepping of the assembly may be conducted. This may include blasting of the surfaces of the assembly. A retainer system including a retainer member and washer may then be assembled to a shank of the tool body. In other embodiments, the final assembly steps may vary. In step 462, the assembly, comprising the wear-resistant armored cutting tool, may be installed into a retention system of a rotating drum using the retainer system. The wear-resistant armored cutting tool may then be used to conduct a cutting operation by rotating the rotating drum.

In other embodiments, one or more steps of the method 440 may not be followed, may be modified in substance or order, or one or more additional steps may be added. In still other embodiments, the method 440 may further vary to manufacture varied wear-resistant armored cutting tools.

One or more embodiments of the disclosure may manufacture or utilize a bolster 16 and one or more mass-efficient wear-resistant members 18 to armor a tool body 12 of a cutting tool 10 to protect it against wear and erosion. This may prevent the tool body 12 from washing-out and causing failure of the cutting tool 10.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A wear-resistant armored cutting tool comprising:
a tool body comprising opposed first and second ends, and
  a pocket, wherein the pocket comprises an inner cylindrical wall-surface, an outer wall-surface, and a floor surface extending between the inner cylindrical wall-surface and the outer wall-surface;
a bolster fixedly attached to the tool body, the first end of the tool body disposed against the bolster;
at least one wear-resistant member fixedly attached within the pocket to the tool body, the at least one wear-resistant member disposed adjacent to the first end of the tool body; and
a cutting tip fixedly attached to the bolster;
wherein the bolster, the at least one wear-resistant member, and the cutting tip each have a material hardness which is greater than that of the tool body;
wherein the bolster completely covers the first end of the tool body, and the bolster is disposed directly adjacent to the at least one wear-resistant member.

2. The wear-resistant armored cutting tool of claim 1 wherein the at least one wear-resistant member comprises a ring which covers an entire circumference of the tool body.

3. The wear-resistant armored cutting tool of claim 1 wherein the at least one wear-resistant member comprises a plurality of abutting wear-resistant members which cover an entire circumference of the tool body.

4. The wear-resistant armored cutting tool of claim 1 wherein the at least one wear-resistant member comprises a plurality of non-abutting wear-resistant members which cover at least 40% of a circumference of the tool body.

5. The wear-resistant armored cutting tool of claim 1 wherein the material hardness of the bolster, the at least one wear-resistant member, and the cutting tip are each at least 58 Rockwell C Hardness (HRC).

6. The wear-resistant armored cutting tool of claim 1 wherein an end of the cutting tip is made of polycrystalline diamond.

7. The wear-resistant armored cutting tool of claim 1 further comprising a retainer member and a washer, wherein the tool body comprises a shank, the retainer member is attached to and over the shank with the washer slidably disposed to and over the retainer member, a retainer tab of the retainer member is disposed within a cavity of the shank attaching the retainer member to the shank, and the washer is slidably movable along the retainer member from a location adjacent the cavity to a second location adjacent a holder of the tool body to allow the retainer member to expand at the location adjacent the cavity.

8. A method of manufacturing a wear-resistant armored cutting tool of claim 1 comprising:
fixedly attaching the at least one wear-resistant member and the bolster to the tool body, the bolster and the at least one wear-resistant member each having a material hardness which is greater than that of the tool body; and
simultaneously achieving a desired microstructure of the tool body.

9. The method of claim 8 wherein the fixedly attaching comprises brazing.

10. The method of claim 8 wherein the desired microstructure comprises a fine grain martensitic structure.

11. The method of claim 8 wherein the achieving comprises heating and rapidly cooling the tool body.

12. The method of claim 8 further comprising subsequently fixedly attaching the cutting tip to the bolster.

13. The method of claim 12 wherein the fixedly attaching comprises brazing.

14. The method of claim 12 wherein the material hardness of the cutting tip is greater than that of the tool body, and an end of the cutting tip comprises polycrystalline diamond.

15. The wear-resistant armored cutting tool of claim 1 wherein the floor surface is disposed perpendicularly to the inner cylindrical wall-surface and the outer wall-surface.

16. The wear-resistant armored cutting tool of claim 1 wherein the inner cylindrical wall-surface extends from the floor surface of the pocket to the first opposed surface of the tool body.

17. The wear-resistant armored cutting tool of claim 1 wherein the outer wall-surface has a shorter length than the inner cylindrical wall-surface.

18. The wear-resistant armored cutting tool of claim 1 wherein the tool body comprises only one pocket, and the at least one wear-resistant member extends from the floor surface of the only one pocket to directly adjacent the bolster.

19. The wear-resistant armored cutting tool of claim 18 wherein there is only one wear-resistant member which covers an entire circumference of the tool body.

20. The wear-resistant armored cutting tool of claim 19 wherein the only one wear-resistant member comprises an inner cylindrical surface which is disposed directly against the inner cylindrical wall-surface, an outermost surface, and a bottom surface disposed between the inner cylindrical surface and the outermost surface, the bottom surface disposed directly against the floor surface of the pocket, and the outer wall-surface of the pocket covering less than an entire length of the outermost surface.

21. A wear-resistant armored cutting tool comprising:
a tool body comprising a pocket, wherein the pocket comprises an inner cylindrical wall-surface, an outer wall-surface, and a floor surface extending between the inner cylindrical wall-surface and the outer wall-surface;
a bolster fixedly attached to the tool body;
at least one wear-resistant member fixedly attached to the tool body within the pocket; and
a cutting tip fixedly attached to the bolster, an end of the cutting tip made of polycrystalline diamond;
wherein the bolster, the at least one wear-resistant member, and the cutting tip each have a material hardness which is greater than that of the tool body;
wherein the bolster completely covers an end of the tool body, and the bolster is disposed directly adjacent to the at least one wear-resistant member.

22. The wear-resistant armored cutting tool of claim 21 wherein the at least one wear-resistant member comprises a ring which covers an entire circumference of a surface of the tool body.

23. The wear-resistant armored cutting tool of claim 21 wherein the at least one wear-resistant member comprises a plurality of abutting wear-resistant members which cover an entire circumference of a surface of the tool body.

24. The wear-resistant armored cutting tool of claim 21 wherein the at least one wear-resistant member comprises a plurality of non-abutting wear-resistant members which cover at least 40% of a circumference of a surface of the tool body.

25. The wear-resistant armored cutting tool of claim 21 wherein the material hardness of the bolster, the at least one wear-resistant member, and the cutting tip are each at least 58 Rockwell C Hardness (HRC).

26. The wear-resistant armored cutting tool of claim 21 further comprising a retainer member and a washer, wherein the tool body comprises a shank, the retainer member is attached to and over the shank with the washer slidably disposed to and over the retainer member, a retainer tab of the retainer member is disposed within a cavity of the shank, attaching the retainer member to the shank, and the washer is slidably movable along the retainer member from a location adjacent the cavity to a second location adjacent a holder of the tool body to allow the retainer member to expand at the location adjacent the cavity.

* * * * *